US008932395B2

(12) United States Patent
DeRosa et al.

(10) Patent No.: US 8,932,395 B2
(45) Date of Patent: Jan. 13, 2015

(54) CERAMIC COMPOSITIONS FOR REDUCED PLUG RATE

(75) Inventors: Rebecca L DeRosa, Painted Post, NY (US); Azita Eshraghi, Horseheads, NY (US); Misty Riesbeck, Lindley, NY (US)

(73) Assignee: Corning Incorporated, Corning, NY (US)

( * ) Notice: Subject to any disclaimer, the term of this patent is extended or adjusted under 35 U.S.C. 154(b) by 333 days.

(21) Appl. No.: 13/477,662

(22) Filed: May 22, 2012

(65) Prior Publication Data

US 2012/0302426 A1    Nov. 29, 2012

Related U.S. Application Data

(60) Provisional application No. 61/490,379, filed on May 26, 2011.

(51) Int. Cl.
| | | |
|---|---|---|
| C04B 35/185 | (2006.01) | |
| C04B 35/636 | (2006.01) | |
| C04B 35/18 | (2006.01) | |
| C04B 35/195 | (2006.01) | |

(52) U.S. Cl.
CPC .............. *C04B 35/18* (2013.01); *C04B 35/185* (2013.01); *C04B 35/195* (2013.01); *C04B 35/6365* (2013.01); *C04B 2235/6021* (2013.01)
USPC ................ 106/172.1; 106/175.1; 106/197.01; 106/198.1

(58) Field of Classification Search
CPC .. C04B 35/6365; C04B 35/18; C04B 35/185; C04B 35/195; C04B 35/478; C04B 38/0006; C04B 38/02; C04B 2111/0081; C04B 2111/00793; C04B 2235/6021
USPC .................... 106/175.1, 197.01, 198.1, 172.1
See application file for complete search history.

(56) References Cited

U.S. PATENT DOCUMENTS

| | | | | |
|---|---|---|---|---|
| 7,704,296 | B2 | 4/2010 | Merkel | 55/523 |
| 8,641,815 | B2 * | 2/2014 | Crume | 106/162.8 |
| 8,728,224 | B2 * | 5/2014 | Niinobe | 106/197.01 |
| 2010/0117272 | A1 * | 5/2010 | Derosa | 264/631 |

OTHER PUBLICATIONS

"Calorimetric Study of Aqueous Solutions of Hydroxypropy Cellulose"; Macromolecules 1991, 24, p. 2413-2418; Robitaille et al.
"Hydration-dehydration properties of methylcellulose and hydroxypropylemethylcellulose"; Sarkar et al; Carbohydrate Polymers 27 (1995), p. 177-185.

* cited by examiner

*Primary Examiner* — David M Brunsman
(74) *Attorney, Agent, or Firm* — Charles A. Greene

(57) ABSTRACT

A precursor batch composition that can be used to make porous ceramic articles is provided. The batch composition includes a cellulose-based polymer and, in particular, a methylcellulose having a number average molecular weight ($M_n$) from about 120,000 to about 170,000 grams per mole and showing a specified micro-calorimetry thermal response fingerprint.

19 Claims, 3 Drawing Sheets

CERAMIC COMPOSITIONS FOR REDUCED PLUG RATE

CROSS-REFERENCE TO RELATED APPLICATIONS

This application claims the benefit of priority under 35 U.S.C. §119 of U.S. Provisional Application Ser. No. 61/490,379 filed on May 26, 2011, the content of which is relied upon and incorporated herein by reference in its entirety.

BACKGROUND

The disclosure relates generally to ceramic precursor batch compositions and more particularly to ceramic precursor batch compositions and batches for forming ceramic honeycombs.

In the formation of ceramic bodies, e.g., silicon carbide, cordierite, mullite, alumina, or aluminum titanate bodies, plasticized mixtures of various inorganic powder batches are prepared which are then formed into various shapes. These plasticized mixtures should be well blended and homogeneous in order for the resulting shaped body to have relatively good integrity in both size and shape, and uniform physical properties. These mixtures typically further include organic additives such as binders, plasticizers, surfactants, lubricants, and dispersants as processing aids to enhance cohesion, plasticity, lubricity, and/or wetting, and therefore to produce a more uniform batch.

Cellulose ethers have been used as extrusion binders to impart plasticity while imparting good drying behavior. While other ceramic binder systems can also be used for ceramic extrusion, cellulose ethers such as methylcellulose (MC), hydroxypropylcellulose (HPMC) and hydroxyethylmethylcellulose (HEMC) can form high temperature gels. The gelling behavior facilitates rapid drying while preventing distortions that can occur with other binder systems as they are heated.

Certain types of ceramic honeycombs, such as substrates for automotive catalytic converter systems, need to meet a variety of performance characteristics. Such requirements not only affect the types of materials that can be successfully combined to make the ceramic honeycombs but also the geometry of the honeycombs. For example, demand for substrates having very thin webs (i.e., less than 2.5 mil (0.0025 inch, 0.0635 mm)) has dramatically increased. Manufacturing such structures entails many technical challenges, including the fact that such manufacture typically involves the use of screens and dies having smaller open areas that can more easily become plugged. Such plugging is undesirable and can not only result in the need for frequent part or equipment replacement but can also at least temporarily shut down an entire production line.

Decreasing the particle size of inorganic raw materials used in the batch compositions can help to reduce the propensity for screens and dies to become plugged. However, there is a continued need to minimize this occurrence, particularly in the manufacture of ceramic honeycomb structures having very thin webs.

SUMMARY

One embodiment of the disclosure relates to a ceramic precursor batch composition. The ceramic precursor batch composition includes inorganic ceramic-forming ingredients and a cellulose-based polymer. The cellulose-based polymer includes a methylcellulose having a number average molecular weight ($M_n$) from about 120,000 to about 170,000 grams per mole and showing a micro-calorimetry thermal response comprising first and second peaks above a gelation onset temperature.

Another embodiment of the disclosure relates to a method of producing a ceramic precursor batch composition. The method includes compounding inorganic ceramic-forming ingredients and a cellulose-based polymer. The cellulose-based polymer includes a methylcellulose having a number average molecular weight ($M_n$) from about 120,000 to about 170,000 grams per mole and showing a micro-calorimetry thermal response comprising first and second peaks above a gelation onset temperature.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
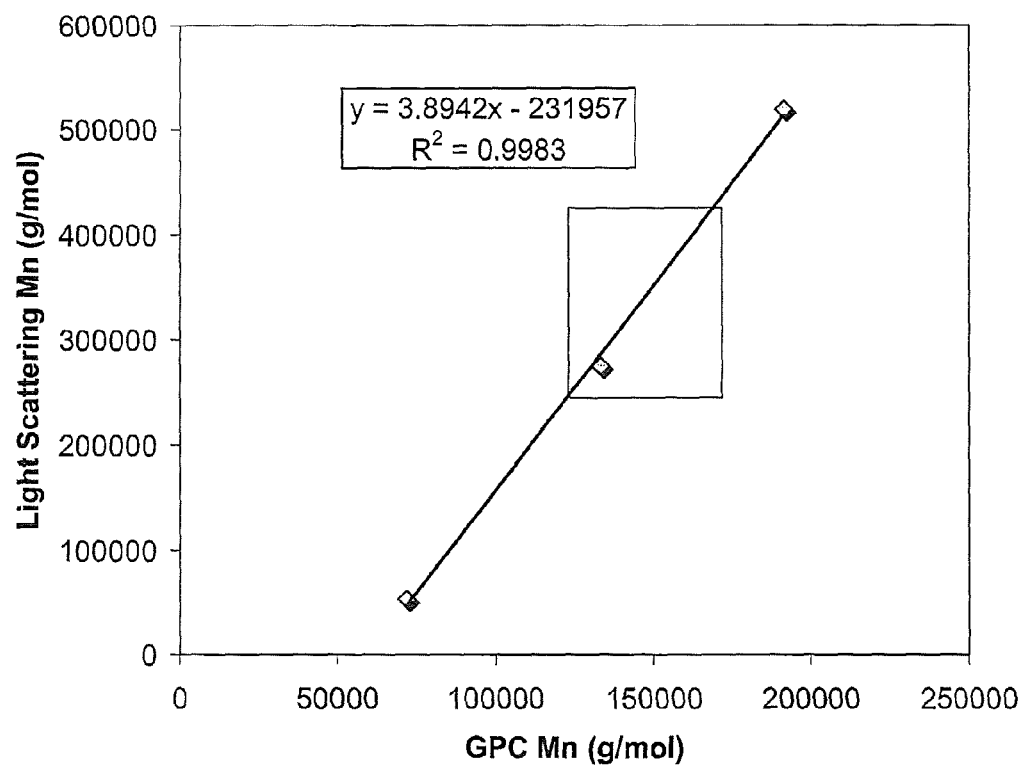
FIG. 1 plots a relationship between results obtained from measuring cellulose-based polymer number average molecular weight ($M_n$) using gel permeation chromatography (GPC) and light scattering methods disclosed herein.

Various embodiments of the disclosure will be described in detail with reference to the drawings, if any.

Number average molecular weight ($M_n$) relates notionally to the total weight of molecules divided by the total number of molecules in a polymer. A reported $M_n$ value is a dependent on the analytical method used to obtain it.

Weight average molecular weight ($M_w$) relates notionally to the average weight of a molecule that a random monomer in a polymer belongs to. A reported $M_w$ value is dependent on the analytical method used to obtain it. The same analytical method used to determine number average molecular weight can be used to determine weight average molecular weight, as $M_n$ and $M_w$ are each different statistical representations of data obtained from the method.

Polydispersity index (PDI) refers to the value obtained by dividing the weight average molecular weight ($M_w$) by the number average molecular weight ($M_n$) or, in other words, $PDI=M_w/M_n$. When PDI is referred to herein, it is understood that $M_w$ and $M_n$ were determined using the same analytical method.

"Micro-calorimetry thermal response" refers to the thermal response of a material subjected to the micro-differential scanning calorimetry test method described herein.

"Gelation onset temperature" refers to the temperature at which, when a material is subjected to the micro-calorimetry test method described herein, the material begins to exhibit an endothermic response upon heating, indicating the onset of transformation of the material from a hydrophilic solute to a hydrophobic gel.

"$T_{onset}$" refers to the temperature at which the rheology of the batch begins to transition from low to high.

"Methylcellulose" refers to a class of cellulose-based polymers that are cellulose ethers having at least some degree of methoxy substitution and may also optionally have additional molar substitution, such as hydroxypropyl substitution to form hydroxypropyl methylcellulose (HPMC).

"Methoxy degree of substitution" is the average number of methoxy groups attached per anhydroglucose unit of a cellulose-based polymer.

"Hydroxypropyl molar substitution" is the number of moles of hydroxypropyl groups per molecule of anhydroglucose in a cellulose-based polymer.

Compositions disclosed herein can, in exemplary embodiments, provide for substrates having very thin webs (i.e., less than 2.5 mil (0.0025 inch, 0.0635 mm)) while at the same time, dramatically decreasing the propensity for screens and dies used during the extrusion and manufacturing process to become plugged (i.e., plug rate). Such decrease in plugging, in turn, results in a decreased need for part or equipment replacement while decreasing or virtually eliminating instances of temporary shut down of an entire production line that would otherwise occur as a result of plugging.

Compositions disclosed herein comprise inorganic-ceramic forming ingredients as well as organic ingredients or additives, wherein the organic ingredients or additives include at least one cellulose-based polymer.

The inorganic ceramic-forming ingredients may be synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the ceramic body.

In one set of exemplary embodiments, the inorganic ceramic-forming ingredients may yield an aluminum-titanate ceramic material upon firing. In other exemplary embodiments, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight.

One composition, by way of a non-limiting example, which ultimately forms cordierite upon firing is as follows in percent by weight: about 33-41, such as about 34-40 of aluminum oxide, about 46-53 such as about 48-52 of silica, and about 11-17 such as about 12-16 magnesium oxide.

The at least one cellulose-based polymer, which can act as a binder in the compositions disclosed herein, comprises a methylcellulose having a number average molecular weight ($M_n$) from about 120,000 to about 170,000 grams per mole and showing a micro-calorimetry thermal response comprising first and second peaks above the gelation onset temperature, as described in more detail below. In one set of exemplary embodiments, the methylcellulose is a hydroxypropyl methylcellulose (HPMC).

The hydroxypropyl methylcellulose (HPMC) can, for example, have a methoxy degree of substitution from about 1.6 to 2.0, such as from about 1.7 to 1.9, including about 1.8, and a hydroxypropyl molar substitution from about 0.10 to 0.25, such as from about 0.12 to 0.20, including about 0.13. Examples of hydroxypropyl methylcelluose include, but are not limited to F-type HPMC available from Dow Chemical as F240LF, Shin Etsu product BD06A, and Aqualon product Cuminal 724.

The methylcellulose, such as HPMC, can have a polydispersity index (PDI) of at least about 3.5, such as a PDI of between about 3.5 and 6.5, and further such as a PDI of between about 3.5 and 5.5, and still further such as a PDI of between about 3.5 and 4.5.

The cellulose-based polymer can be present in the ceramic precursor batch composition in an amount of at least 1.0% on a weight percent by super addition basis, such as an amount ranging from about 1.0% to about 5.0% on a weight percent by super addition basis, and further such as an amount ranging from about 2.0% to about 4.0%, on a weight percent by super addition basis.

In exemplary embodiments at least 50%, such as at least 60%, and further such as at least 70%, and still further such as at least 80%, and yet still further such as at least 90%, and even further such as at least 95%, and yet even further such as at least 98%, and still yet even further such as at least 99% of the total amount of cellulose-based polymer in the ceramic precursor batch composition is a cellulose-based polymer comprising a methylcellulose, such as hydroxypropyl methylcellulose (HPMC), having a number average molecular weight ($M_n$) from about 120,000 to about 170,000 grams per mole and showing a micro-calorimetry thermal response comprising first and second peaks above the gelation onset temperature.

In exemplary embodiments, the ceramic precursor batch composition comprises inorganic ceramic-forming ingredients and a cellulose-based polymer, wherein essentially all of the cellulose-based polymer in the composition is a methylcellulose, such as hydroxypropyl methylcellulose (HPMC), having a number average molecular weight ($M_n$) from about 120,000 to about 170,000 grams per mole and showing a micro-calorimetry thermal response comprising first and second peaks above the gelation onset temperature.

In exemplary embodiments, the ceramic precursor batch composition comprises inorganic ceramic-forming ingredients and a cellulose-based polymer, wherein the cellulose-based polymer consists essentially of a methylcellulose, such as hydroxypropyl methylcellulose (HPMC), having a number average molecular weight ($M_n$) from about 120,000 to about 170,000 grams per mole and showing a micro-calorimetry thermal response comprising first and second peaks above the gelation onset temperature.

Compositions disclosed herein can also include at least one solvent. The solvent may provide a medium for the cellulose-based polymer to dissolve in thus providing plasticity to the ceramic precursor batch and wetting of the powders. The solvent may be aqueous based such as, but not limited to, water or water-miscible solvents. Most useful may be aqueous based solvents which provide hydration of the binder and powder particles. Typically, the amount of aqueous solvent may be from about 18% by weight to about 50% by weight, on a weight percent by super addition basis.

Compositions disclosed herein can also comprise at least one salt. The salt can be present with the cellulose-based polymer (for example, in a system containing the cellulose-based polymer and a solvent) before the cellulose-based polymer is mixed with the other batch ingredients or the salt can be added as a separate ingredient or both. Examples of salts that can be used include sodium chloride, magnesium chloride, ferric chloride, sodium sulfate, aluminum sulfate, sodium carbonate, sodium phosphate The ceramic precursor batch composition may further comprise other additives such as surfactants, oil lubricants and pore-forming material. Non-limiting examples of surfactants that may be used in certain exemplary embodiments include $C_8$ to $C_{22}$ fatty acids and/or their salts or derivatives. Additional surfactant components that may be used with these fatty acids include $C_8$ to $C_{22}$ fatty esters, $C_8$ to $C_{22}$ fatty alcohols, and combinations of these. Exemplary surfactants include stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, and combinations of these. The amount of surfactants typically may be from about 0.25% by weight to about 2% by weight, on a weight percent by super addition basis.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight, on a weight percent by super addition basis. In an exemplary embodiment, the oil lubricants may be present from about 3% by weight to about 6% by weight, on a weight percent by super addition basis.

In filter applications, such as in diesel particulate filters, it may be desirable to include a pore forming material in the mixture in an amount effective to subsequently obtain the porosity required for efficient filtering. Examples of pore forming materials include particulate substances (not binders) that burn out of the green body in the firing step. Some types of pore forming materials that may be used, although it is to be understood that embodiments herein are not limited to these, include non-waxy organics that are solid at room temperature, elemental carbon, and combinations of these. Some examples may be graphite, starch, cellulose, flour, etc. In one exemplary embodiment, the pore forming material may be elemental carbon. In another exemplary embodiment, the pore forming material may be graphite, which may have the least adverse effect on the processing. In an extrusion process, for example, the rheology of the mixture may be good when graphite is used. The pore forming material may be up to about 60% by weight as a superaddition. Typically, the amount of graphite may be from about 1% to about 30%, and more typically about 3% to about 15% by weight based on the inorganic ceramic-forming ingredients. If a combination of graphite and flour are used, the amount of pore forming material may be typically from about 1% by weight to about 25% by weight with the graphite at 5% by weight to 10% of each and the flour at 5% by weight to about 10% by weight.

The disclosure also provides a method of producing a ceramic honeycomb body, comprising the steps of compounding inorganic ceramic-forming ingredients and a cellulose-based polymer, among other ingredients. The ingredients may be mixed in a muller or plow blade mixer. A solvent may be added in an amount that is less than is needed to plasticize the batch. With water as the solvent, the water hydrates the binder and the powder particles. The surfactant and/or oil lubricant, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (binder, solvent, surfactant, oil lubricant and the inorganics), temperature of the components, the amount of work put in to the batch, the shear rate, and extrusion velocity. During plasticization, the binder dissolves in the solvent and a high viscosity fluid phase is formed. The binder formed is stiff because the system is very solvent-deficient. The surfactant enables the binder phase to adhere to the powder particles.

In a further step, the composition may be extruded to form a green honeycomb body. Extrusion may be done with devices that provide low to moderate shear. For example hydraulic ram extrusion press or two stage de-airing single auger are low shear devices. A single screw extruder is a moderate shear device. The extrusion may be vertical or horizontal.

It will be appreciated that honeycomb bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, may be those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses may be from about 0.07 to about 0.6 mm (about 3 to about 25 mils), although thicknesses of about 0.02-0.048 mm (1-2 mils) are also possible. Methods disclosed herein may be especially suited for extruding thin wall/high cell density honeycombs.

The extrudates may then be dried and fired according to known techniques. The firing conditions of temperature and time may depend on the composition and size and geometry of the body, and embodiments herein are not limited to specific firing temperatures and times. For example, in compositions which are primarily for forming cordierite, the temperatures may typically be from about 1300° C. to about 1450° C., and the holding times at these temperatures may be from about 1 hour to about 6 hours. For mixtures that are primarily for forming mullite, the temperatures may be from about 1400° C. to about 1600° C., and the holding times at these temperatures may be from about 1 hour to about 6 hours. For cordierite-mullite forming mixtures which yield the previously described cordierite-mullite compositions, the temperatures may be from about 1375° C. to about 1425° C. Firing times depend on factors such as kinds and amounts of materials and nature of equipment but typical total firing times may be from about 20 hours to about 80 hours. For metal bodies, the temperatures may be about 1000° C. to 1400° C. in a reducing atmosphere preferably hydrogen. Firing times depend on factors as discussed above but may be typically at least 2 hours and typically about 4 hours. For zeolite bodies, the temperatures may be about 400° C. to 1000° C. in air. Firing times depend on factors as discussed above but may be typically about 4 hours.

Methods Used to Characterize Cellulose-Based Polymers
Gel Permeation Chromatography (GPC)
Number average molecular weight ($M_n$) was determined using gel permeation chromatography (GPC). Samples were prepared in a regulated solution, which was also used as the mobile phase during analysis. This solution included 0.01 M NaCl and 200 ppm $NaN_3$ in 18.2 M Ω water. To prepare one liter of this mobile phase we added 0.5844 g NaCl (CAS 7647-14-5) and 0.2 g $NaN_3$ (CAS: 26628-22-8 & CAS7782-79-8) to 1-liter 18.2 M Q water. The solution was stirred for 10 minutes at room temperature and then vacuum filtered through a hydrophilic 0.22 micron filter. The pH of this mobile phase was about 6.84. For sample preparation, the mobile phase was heated to 85° C. and HPMC powder was added to a concentration of 1 mg/ml (0.1%) to create a suspension. The solution was formed by slowly cooling the suspension to room temperature while stirring over a 16-24 hour period.

For GPC analysis, the samples were run on a Waters Alliance 2695 System fitted with two Phenomenex TSK GMP-WxL columns. These columns were dedicated to HPMC samples only with no other polymers having been run through them except for reference materials. Samples were not filtered prior to injection into the separation columns. The column temperature was maintained at 35° C. The detector was a Waters Refractive Index detector. The columns were calibrated against a series of pullulan polysaccharide standards (Polymer Labs) ranging from 180 to 1,660,000 g/mol. A linear calibration curve was obtained with at least an $R^2=0.994$.

The results of the GPC method were compared against those obtained by a light scattering method. Samples for light scattering were prepared in the same regulated solution used for GPC analysis, with HMPC at 2.1 to 2.2 mg/ml (0.21-0.22%) concentration. The samples were also run on a Waters Alliance 2695 System fitted with two Phenomenex TSK GMPWxL columns, which were dedicated to HPMC samples and no other polymers. The flow rate was 1 ml/min and the column temperature was maintained at 35° C. The light scattering detection system consisted of two detectors from Wyatt technology; the light scattering detector was DAWN HELEOS, the cell type for this instrument was K5 and the laser wavelength was 658.0 nm. The second detector was an Optilab rEX RI detector. The light scattering and the RI detector temperature were set at 35° C. The Zimm model with fit degree of 1 was used for the light scattering data processing.

FIG. 1 shows the relationship between the GPC and light scattering methods described above. The correlation between the two methods is >0.99, indicating a very strong linear relationship between number average molecular weight ($M_n$) values obtained by using either method. The box indicates $M_n$ from about 120,000 to about 170,000 grams per mole using GPC, with corresponding $M_n$ values obtained from light scattering.

Micro-Calorimetry Test Method

The following micro-differential scanning calorimetry test method was used to determine the micro-calorimetry thermal response of cellulose-based polymers described herein. HPMC was the cellulose-based polymer used in the test method. The test method, which is a type of solution micro-differential scanning calorimetry method, is a sensitive analytical technique used to measure the endothermic heat of de-hydration for HPMC upon heating. Under heating, HPMC undergoes dehydration and eventually gelation, which is captured by an endothermic response in the micro-calorimeter. The endothermic peak(s) is the response due to the thermal transition of HPMC from a hydrophilic solute to a hydrophobic gel.

The micro-calorimetry test method is performed by first preparing a 0.5 weight percent aqueous solution of HPMC using a standard method of heating ultra-pure water (18.2 MΩ) to 90° C. and dispersing the needed amount of HPMC into the hot water to create a suspension. The suspension is slowly cooled to room temperature while stirring to create a homogenous solution. The solution is stored in a refrigerated environment for at least 48 hours to ensure complete hydration of the HPMC molecules. The solution is removed from the refrigerator several hours prior to µ-DSC testing to equilibrate the solution temperature to room temperature. Upon equilibrating to room temperature, a sample is prepared specific to the calorimeter used and tested. Our standard testing parameters are an isothermal hold at 26° C. for 20 minutes followed by a temperature ramp at 0.7° C./minute from 26 to 100° C. Then a cooling profile is used from 100 to 26° C. at 0.7° C./min. Both endothermic de-hydration and exothermic re-hydration events are recorded.

An endothermic de-hydration event or endothermic response upon heating is a micro-calorimetry thermal response having a fingerprint that includes at least one "peak" using the above-described test method. The endothermic response begins when the temperature of the solution reaches the gelation onset temperature. At temperatures below the gelation onset temperature, the solution in the above-described test method exhibits an approximately constant increase in temperature per amount of heat added to the solution. At the gelation onset temperature and in a temperature range above it, the solution temperature increase per the amount of heat added deviates from that observed below the gelation onset temperature. A temperature above the gelation onset temperature at which this deviation reaches a localized maximum is a peak at its maximum intensity.

A micro-calorimetry thermal response fingerprint from the above-described test method can include just a single peak or it can include more than one peak. When having more than one peak, the first peak maximum intensity occurs at the temperature above the gelation onset temperature at which the above-described deviation first reaches a localized maximum. In a temperature range above this first peak maximum intensity temperature, the above-described deviation decreases to a localized minimum, referred to as the dividing point between the first and second peaks. In a temperature range above the dividing point between the first and second peaks, the above-described deviation increases to a second localized maximum. The second peak maximum intensity occurs at the temperature of this second localized maximum.

Figure 2:
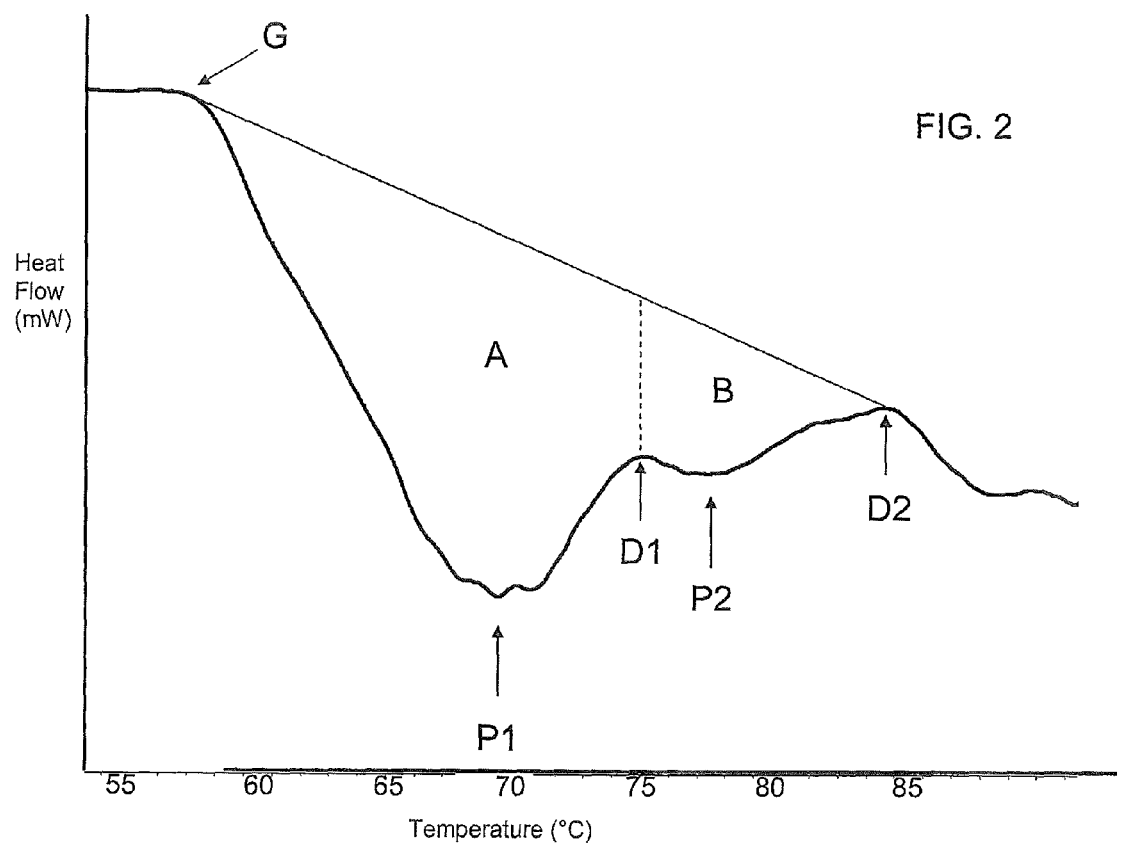
FIG. 2 plots a micro-calorimetry thermal response fingerprint for a cellulose-based polymer using the micro-calorimetry test method disclosed herein.

The phenomenon of one or more peaks occurring in a micro-calorimetry thermal response fingerprint can, perhaps, best be illustrated graphically. FIG. 2 illustrates a micro-calorimetry thermal response fingerprint from the above-described test method, wherein the micro-calorimetry thermal response includes first and second peaks above the gelation onset temperature. In FIG. 2, gelation onset temperature is indicated by G, first peak maximum intensity temperature is indicated by P1, the dividing point between first and second peaks is indicated by D1, second peak maximum intensity temperature is indicated by P2, and high temperature point of second peak regime is indicated by D2.

The first and second peaks described above can also be characterized by their peak areas. In FIG. 2, the first peak area can be characterized as the area indicated by A and the second peak area can be characterized as the area indicated by B. Each of first and second peak areas can be determined, for example, by using an integration algorithm.

Applicants have surprisingly found that certain ceramic precursor batch compositions having certain cellulose-based polymers included as a binder material can exhibit reduced levels of plug rate. Specifically, applicants have found when that methylcellulose, and particularly hydroxypropyl methylcellulose (HPMC), having a number average molecular weight ($M_n$) from about 120,000 to about 170,000 grams per mole and showing a micro-calorimetry thermal response comprising first and second peaks above the gelation onset temperature is used, substantially reduced levels of plug rate can be achieved.

In certain exemplary embodiments, the micro-calorimetry thermal response exhibits a gelation onset temperature between about 55° C. and 60° C., including between about 56° C. and 59° C., such as about 57.5° C. The micro-calorimetry thermal response also exhibits a first peak having a maximum intensity at a temperature ranging from about 62° C. to about 67° C., including from about 63° C. to about 65° C., such as about 64.5° C., and the second peak has a maximum intensity at a temperature ranging from about 67° C. to about 72° C., including from about 68° C. to about 71° C., such as about 70.6° C.

In certain exemplary embodiments, the first peak has a larger area than the second peak. For example, an area ratio of the first peak to the second peak can be at least about 1.5, such as from about 1.5 to about 3.0, and further such as from about 1.75 to about 2.5, and still further such as from about 1.8 to about 2.0, including about 1.92.

Without wishing to be bound by theory, a micro-calorimetry thermal response comprising first and second peaks may be the result of kosmotropic effects caused by an additive (herein referred to as a kosmotropic agent), such as a salt, being present in the solvent system containing cellulose-based polymers, such as HPMC. Applicants have surprisingly found that in certain HPMC polymers, such as those having a methoxy degree of substitution of about 1.8 and a hydroxypropyl molar substitution of about 0.13, a molar concentration of at least about $1 \times 10^{-3}$ of a kosmotropic agent, such as a salt, in the solvent system containing HPMC correlates to a higher probability of the HPMC showing a micro-calorimetry thermal response having dual peaks as opposed to a micro-calorimetry thermal response having only a single peak. For example, the kosmotropic agent can be present in the solvent system in a molar concentration of from $1 \times 10^{-3}$ to $5 \times 10^{-3}$ such as from $2 \times 10^{-3}$ to $4 \times 10^{-3}$.

Applicants have also surprisingly found that the ratio of dual peak areas can correlate to plug rate, wherein an area ratio of the first peak to the second peak of at least 1.5 results in a lower plug rate than when an area ratio of the first peak to the second peak is less than 1.5.

The disclosure and scope of the appended claims will be further clarified by the following examples.

EXAMPLE

Five ceramic precursor batch compositions were prepared, each having HPMC with differing peak areas as determined by the micro-calorimetry test method described above. The compositions each contained ingredients in amount ranges set forth in Table 1.

TABLE 1

| Inorganic Ingredients | Amount (wt %) |
|---|---|
| Talc | 36-42 |
| Clay (calcined) | 15-20 |
| Clay (hydrous) | 15-20 |

TABLE 1-continued

| Alumina | 18-22 |
|---|---|
| Silica | 5-10 |

| Superadded Ingredients | Amount (wt % in superaddition basis) |
|---|---|
| HPMC | 5-6 |
| Tall Oil | 0.5-2 |
| Polyalpha olefin | 5-10 |

This composition was run through a 50/250 Dutch weave extrusion screen, which was located at the end of a mixer-extruder in tandem.

The plug rate of the ceramic precursor batch composition described above was determined by measuring the pressure on the screen as the composition was passed through it. The term "plug rate value" specifically refers to the rate of increase in measured pressure on the screen over time, which pressure was measured periodically using a pressure probe from the $10^{th}$ minute to the $70^{th}$ minute a new screen was indexed to an extrudate stream of the composition (wherein the extrudate stream was flowing at a rate of not less than 1,000 pounds per hour and not more than 2,000 pounds per hour). The slope of the least squares fit line of measured pressure versus time provides the plug rate value. The higher this value, the higher the probability that undesirable plugging will occur. Preferably, the plug rate value is less than 40 psi/hour, such as less than 35 psi/hour, and further such as less than 30 psi/hour, and yet further such as less than 25 psi/hour.

Figure 3:
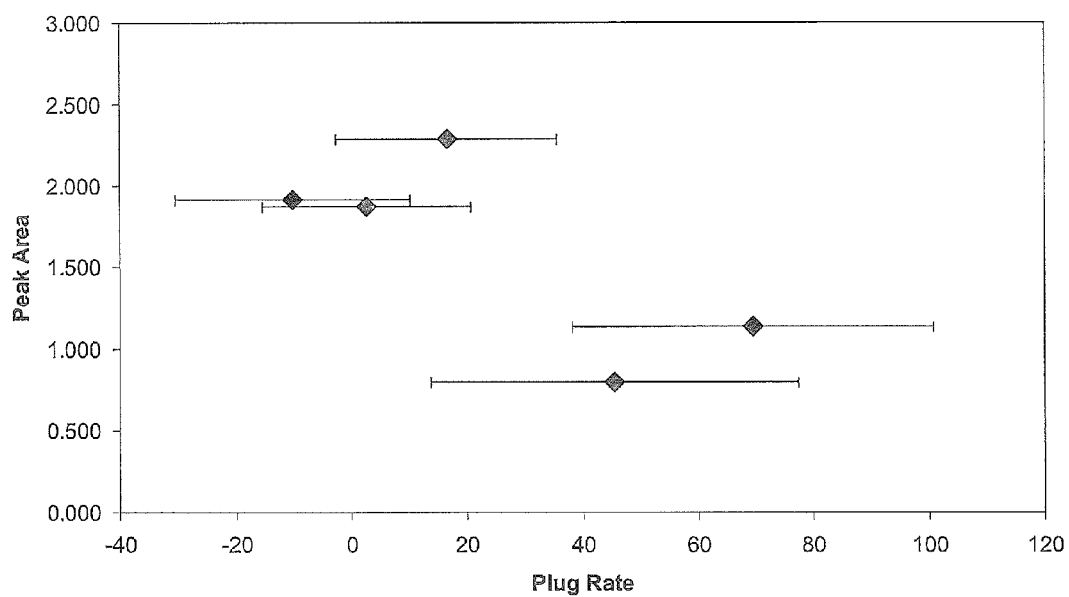
FIG. 3 plots plug rate of exemplary ceramic compositions and micro-calorimetry thermal response peak area ratios of a cellulose-based polymer used in those compositions.

The relationship between plug rate and peak area ratio of the HMPC used in the exemplary ceramic precursor batch compositions described above is shown in FIG. 3. As can be seen, exemplary compositions having HPMC peak area ratios of at least 1.5 exhibited a plug rate of less than 25 psi/hour whereas compositions having HPMC peak area ratios of less than 1.5 exhibited higher plug rates.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A ceramic precursor batch composition comprising:
   inorganic ceramic-forming ingredients and a cellulose-based polymer, wherein the cellulose-based polymer comprises a methylcellulose having a number average molecular weight ($M_n$) from about 120,000 to about 170,000 grams per mole and showing a micro-calorimetry thermal response comprising first and second peaks above a gelation onset temperature.

2. The composition of claim 1, wherein the methylcellulose is a hydroxypropyl methylcellulose (HPMC).

3. The composition of claim 2, wherein the hydroxypropyl methylcellulose (HPMC) has a methoxy degree of substitution from about 1.6 to 2.0 and a hydroxypropyl molar substitution from about 0.10 to 0.25.

4. The composition of claim 1, wherein the methylcellulose has a polydispersity index (PDI) of between about 3.5 and 6.5.

5. The composition of claim 1,
wherein the composition further comprises a kosmotropic agent chosen from the group consisting of sodium chloride, magnesium chloride, ferric chloride, sodium sulfate, aluminum sulfate, sodium carbonate, and sodium phosphate, and
wherein the kosmotropic agent is present in a solvent system containing the cellulose-based polymer.

6. The composition of claim 5, wherein the kosmotropic agent is present in the solvent system containing the cellulose-based polymer in a molar concentration of at least about $1 \times 10^{-3}$.

7. The composition of claim 1, wherein the first peak has a maximum intensity at a temperature ranging from about 63° C. to about 65° C. and the second peak has a maximum intensity at a temperature ranging from about 68° C. to about 71° C.

8. The composition of claim 1, wherein the first peak has a larger area than the second peak.

9. The composition of claim 8, wherein an area ratio of the first peak to the second peak ranges from about 1.5 to about 3.0.

10. The composition of claim 1, wherein at least 50% of the cellulose based polymer in the composition comprises a methylcellulose having a number average molecular weight ($M_n$) from about 120,000 to about 170,000 grams per mole and showing a micro-calorimetry thermal response comprising first and second peaks above the gelation onset temperature.

11. A ceramic precursor batch composition comprising:
inorganic ceramic-forming ingredients and a cellulose-based polymer, the cellulose-based polymer consisting essentially of a methylcellulose having a number average molecular weight ($M_n$) from about 120,000 to about 170,000 grams per mole and showing a micro-calorimetry thermal response comprising first and second peaks above a gelation onset temperature.

12. A method of producing a ceramic precursor batch composition, the method comprising compounding:
inorganic ceramic-forming ingredients; and
a cellulose-based polymer;
wherein the cellulose-based polymer comprises a methylcellulose having a number average molecular weight ($M_n$) from about 120,000 to about 170,000 grams per mole and showing a micro-calorimetry thermal response comprising first and second peaks above a gelation onset temperature.

13. The method of claim 12, wherein the methylcellulose is a hydroxypropyl methylcellulose (HPMC).

14. The method of claim 13, wherein the hydroxypropyl methylcellulose (HPMC) has a methoxy degree of substitution from about 1.6 to 2.0 and a hydroxypropyl molar substitution from about 0.10 to 0.25.

15. The method of claim 12, wherein the methylcellulose has a polydispersity index (PDI) of between about 3.5 and 6.5.

16. The method of claim 12,
wherein the method further comprises compounding a kosmotropic agent chosen from the group consisting of sodium chloride, magnesium chloride, ferric chloride, sodium sulfate, aluminum sulfate, sodium carbonate, and sodium phosphate, and
wherein the kosmotropic agent is present in a solvent system containing the cellulose-based polymer.

17. The method of claim 12, wherein the first peak has a maximum intensity at a temperature ranging from about 63° C. to about 65° C. and the second peak has a maximum intensity at a temperature ranging from about 68° C. to about 71° C.

18. The method of claim 12, wherein the first peak has a larger area than the second peak.

19. The method of claim 18, wherein an area ratio of the first peak to the second peak ranges from about 1.5 to about 3.0.

* * * * *